J. GREER.
VALVE FOR PUMPS.
APPLICATION FILED JULY 6, 1908.

908,562.

Patented Jan. 5, 1909.

Witnesses

Inventor
John Greer.

By
Attorney

UNITED STATES PATENT OFFICE.

JOHN GREER, OF DIXON, ILLINOIS.

VALVE FOR PUMPS.

No. 908,562.  Specification of Letters Patent.  Patented Jan. 5, 1909.

Application filed July 6, 1908. Serial No. 442,058.

*To all whom it may concern:*

Be it known that I, JOHN GREER, a citizen of the United States, residing at Dixon, in the county of Lee and State of Illinois, have invented certain new and useful Improvements in Valves for Pumps, of which the following is a specification.

This invention relates to valves for pumps, and is illustrated in connection with the outlet water valves of a known steam pump.

The invention embodies the idea of placing the springs for closing the valves on the outside of the casing or water cap. In the ordinary pump, the valves are closed by means of coiled springs which are located within the casing and are thus exposed to the action of the water. This action is injurious, especially when hot water is pumped, for the reason that the heat removes the temper of the springs, and thus makes the action of the valves sluggish, and the pump defective. For boiler use, it is, of course, advantageous to heat the feed water and this invention is particularly advantageous where such heated water is pumped.

The invention insures the quick closing of the outlet valves, whereby the lower or intake valves are prevented from becoming steam-bound. Also, the spring being placed on the outside is accessible at all times and can readily be adjusted or attended to. The invention has various other advantages which will be apparent to those familiar with the art.

The invention is illustrated in the accompanying drawings, in which—

Figure 1:
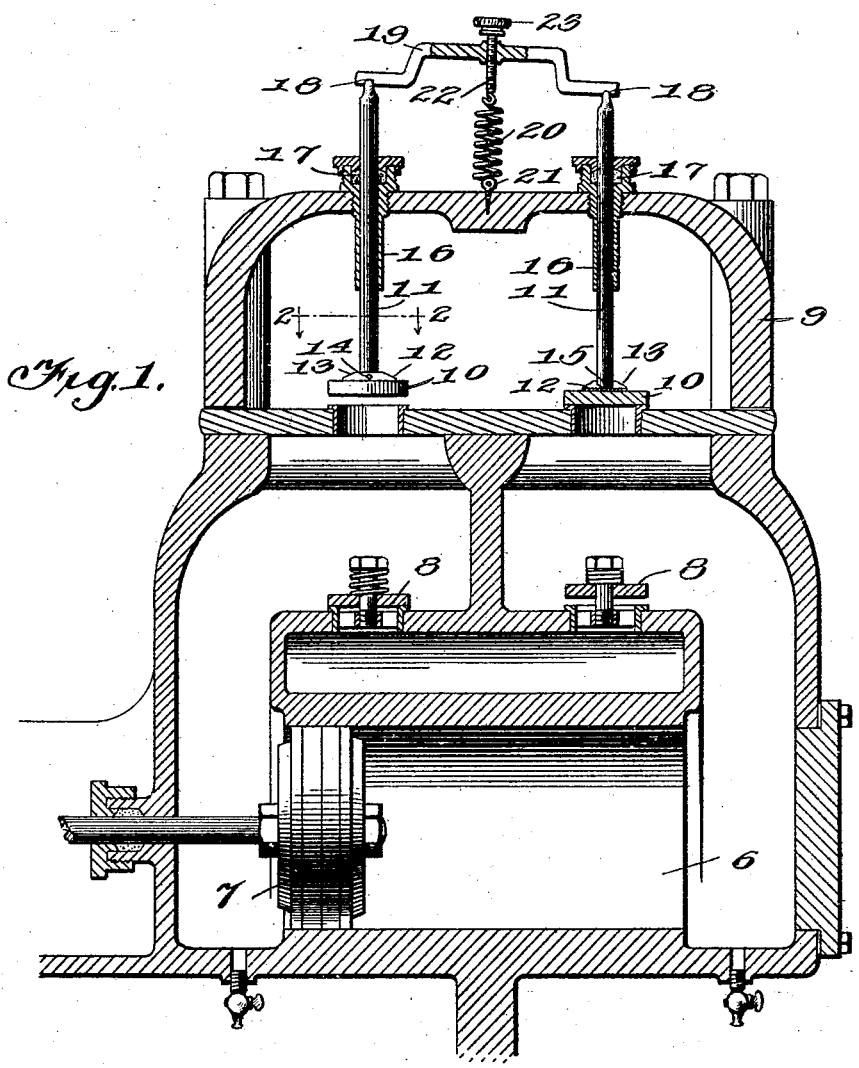
Figure 2:
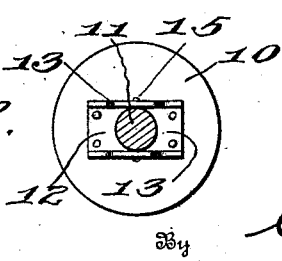

Figure 1 is a longitudinal vertical section of the water cylinder of a steam pump, with the invention applied thereto; and Fig. 2 is a section on the line 2—2 of Fig. 1.

Referring specifically to the drawings, 6 indicates the water cylinder and 7 the piston therein. The inlet valves are indicated at 8, and are of the usual type. The water cap 9 incloses the outlet valves as usual. Each of the outlet valves consists of a disk 10 to which a rod 11 is connected. The connection is formed by means of a shoe or plate 12 having flanges 13 at opposite sides. This plate is riveted to the disk, and its flanges have holes 14 which receive a cross pin 15 at the foot of the valve stem, so that a pivotal joint is formed which allows a certain amount of play to the valve disk. The valve stem works up and down through a tube 16 which projects through the water cap and which guides the movement of the stem. This tube is provided at the top with a stuffing box 17 through which the stem works. The upper ends of the stems of the valves fit loosely in recesses at 18 in the under side of the opposite ends of a yoke 19 which extends across from one valve stem to the other, on the outside of the water cap. At the middle of the yoke is a spring 20 which acts to close the valves, being connected at its lower end to an eye 21 set in the water cap and at its upper end to a screw eye 22 which extends through the yoke and is provided with an adjusting thumb nut 23, whereby the tension of the spring may be varied.

The yoke acts as a lever, being, so to speak, fulcrumed on the opposite valve stems alternately, and the action of the spring tends to close the valve. When one valve is lifted, the lifting pressure is applied to close the other valve and to hold it closed until the return stroke, when the opposite action takes place. It is obvious that the spring is not exposed to the action of the fluid being pumped. The quick action of the outlet valves assists the quick action or closing of the inlet valves and consequently the action of the inlet valves is not interfered with by back pressure.

The invention is not limited to the exact construction shown, but various modifications may be made within the scope thereof, as indicated in the following claims.

This device can be readily attached to other pumps by removing the air chamber, the outlet valve and the springs, and substituting the valves and the other parts above described.

In the operation of the present invention the lower intake valves are greatly assisted in their action by the pressure of the fluid incident to the operation, because of the quick and effective action of the outlet valves.

I claim:

1. In a pump, the combination of a valve chest, a pair of valves having stems extending through the wall of the valve chest, a yoke connected to the outer ends of the stems, and a spring connected to said yoke and tending to close the valves.

2. In a pump, the combination of a valve chest or casing having guides in the wall thereof, a pair of valves in the chest, having stems working through said guides, and a spring-pressed yoke connecting the outer ends of the stems.

3. In a pump, the combination of a valve chest having guide tubes projecting inwardly from the wall thereof provided with stuffing boxes, valves in the chest having stems working in said tubes and boxes, a yoke connecting said stems on the outside of the chest, and a spring connected to the yoke and tending to close the valves.

4. In a pump, the combination of a valve chest, a pair of valves having stems extending through the wall of the valve chest, a yoke connecting said stems and having seats in which the outer ends of the stems fit, and an adjustable spring connected to the yoke at the middle thereof and acting to close the valves.

In testimony whereof, I affix my signature in presence of two witnesses.

JOHN GREER.

Witnesses:
  BLAKE GROVER
  WILLIAM YORK.